United States Patent
Hasegawa et al.

(10) Patent No.: US 9,071,837 B2
(45) Date of Patent: Jun. 30, 2015

(54) TRANSCODER FOR CONVERTING A FIRST STREAM TO A SECOND STREAM BASED ON A PERIOD CONVERSION FACTOR

(75) Inventors: Hiromu Hasegawa, Osaka (JP); Nobuyuki Takasu, Osaka (JP); Makoto Saito, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 736 days.

(21) Appl. No.: 13/401,198

(22) Filed: Feb. 21, 2012

(65) Prior Publication Data

US 2012/0147969 A1 Jun. 14, 2012

Related U.S. Application Data

(62) Division of application No. 12/360,350, filed on Jan. 27, 2009.

(30) Foreign Application Priority Data

Feb. 25, 2008 (JP) ................. 2008-042427

(51) Int. Cl.
| | |
|---|---|
| *H04N 19/114* | (2014.01) |
| *H04N 19/169* | (2014.01) |
| *H04N 19/15* | (2014.01) |
| *H04N 19/115* | (2014.01) |
| *H04N 19/61* | (2014.01) |
| *H04N 19/126* | (2014.01) |
| *H04N 19/157* | (2014.01) |
| *H04N 19/162* | (2014.01) |
| *H04N 19/177* | (2014.01) |
| *H04N 19/40* | (2014.01) |

(52) U.S. Cl.
CPC ........... *H04N 19/114* (2014.11); *H04N 19/169* (2014.11); *H04N 19/15* (2014.11); *H04N 19/115* (2014.11); *H04N 19/61* (2014.11); *H04N 19/126* (2014.11); *H04N 19/157* (2014.11); *H04N 19/162* (2014.11); *H04N 19/177* (2014.11); *H04N 19/40* (2014.11)

(58) Field of Classification Search
CPC .................................................. H04N 19/169
See application file for complete search history.

(56) References Cited

U.S. PATENT DOCUMENTS

| | | | |
|---|---|---|---|
| 2007/0286289 | A1 | 12/2007 | Arai et al. |
| 2008/0031337 | A1 | 2/2008 | Hasegawa et al. |
| 2009/0009370 | A1 | 1/2009 | Hasegawa et al. |
| 2009/0213929 | A1 | 8/2009 | Hasegawa et al. |
| 2011/0075731 | A1 | 3/2011 | Hasegawa |
| 2011/0134997 | A1 | 6/2011 | Narimatsu et al. |

FOREIGN PATENT DOCUMENTS

| | | |
|---|---|---|
| JP | 2006-74635 | 3/2006 |
| JP | 2007-300593 | 11/2007 |
| JP | 2008-42426 | 2/2008 |

*Primary Examiner* — Young Lee
(74) *Attorney, Agent, or Firm* — Oblon, McClelland, Maier & Neustadt, L.L.P.

(57) ABSTRACT

If the number of frames in a GOP of an input stream is not less than 15, the GOP is determined as a control unit time. If the number of frames in the GOP is less than 15, the following GOP is connected thereto until the number of frames becomes not less than 15 and the connected GOPs are determined as a control unit time. After correcting the control unit time, the average input bit rate $S_n$ in each control unit time is obtained, and by using information on the input stream including the average input bit rate $S_n$, a quantization step value of an output stream is calculated.

12 Claims, 10 Drawing Sheets

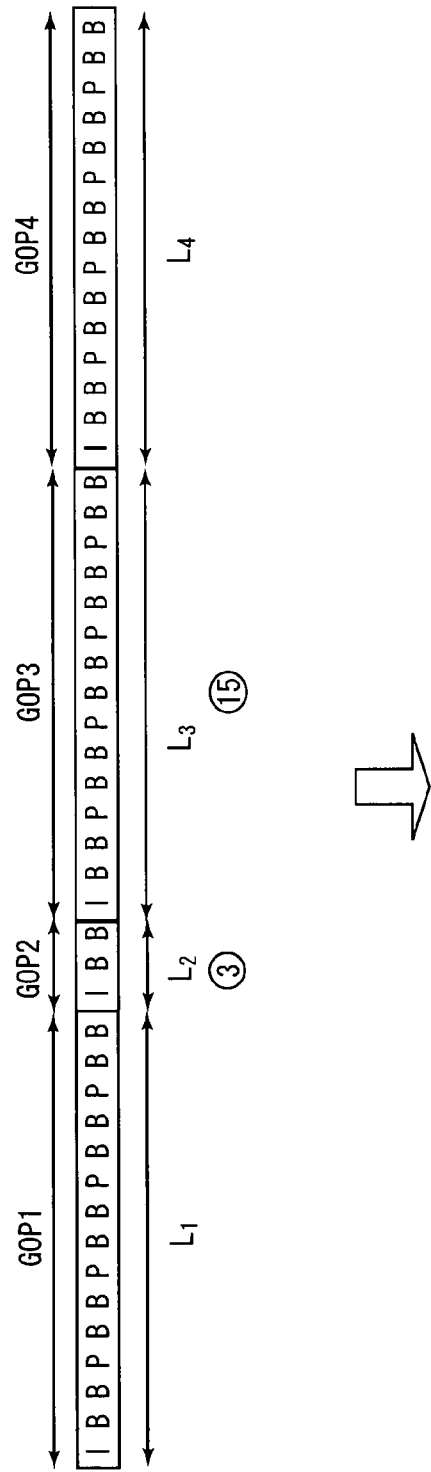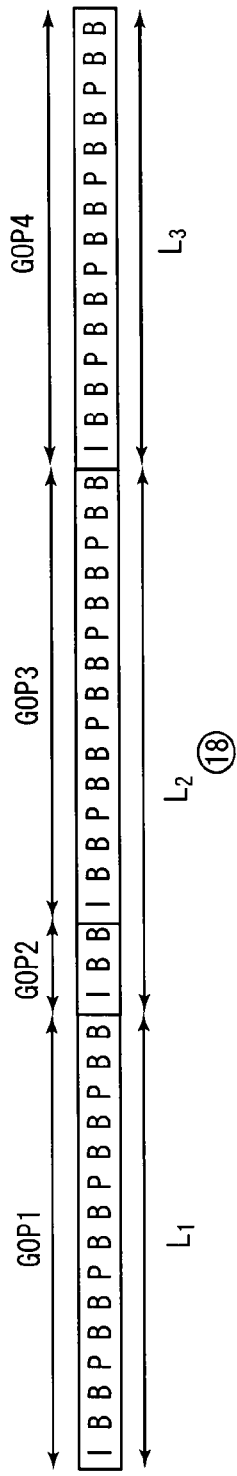
FIG. 5A
FIG. 5B

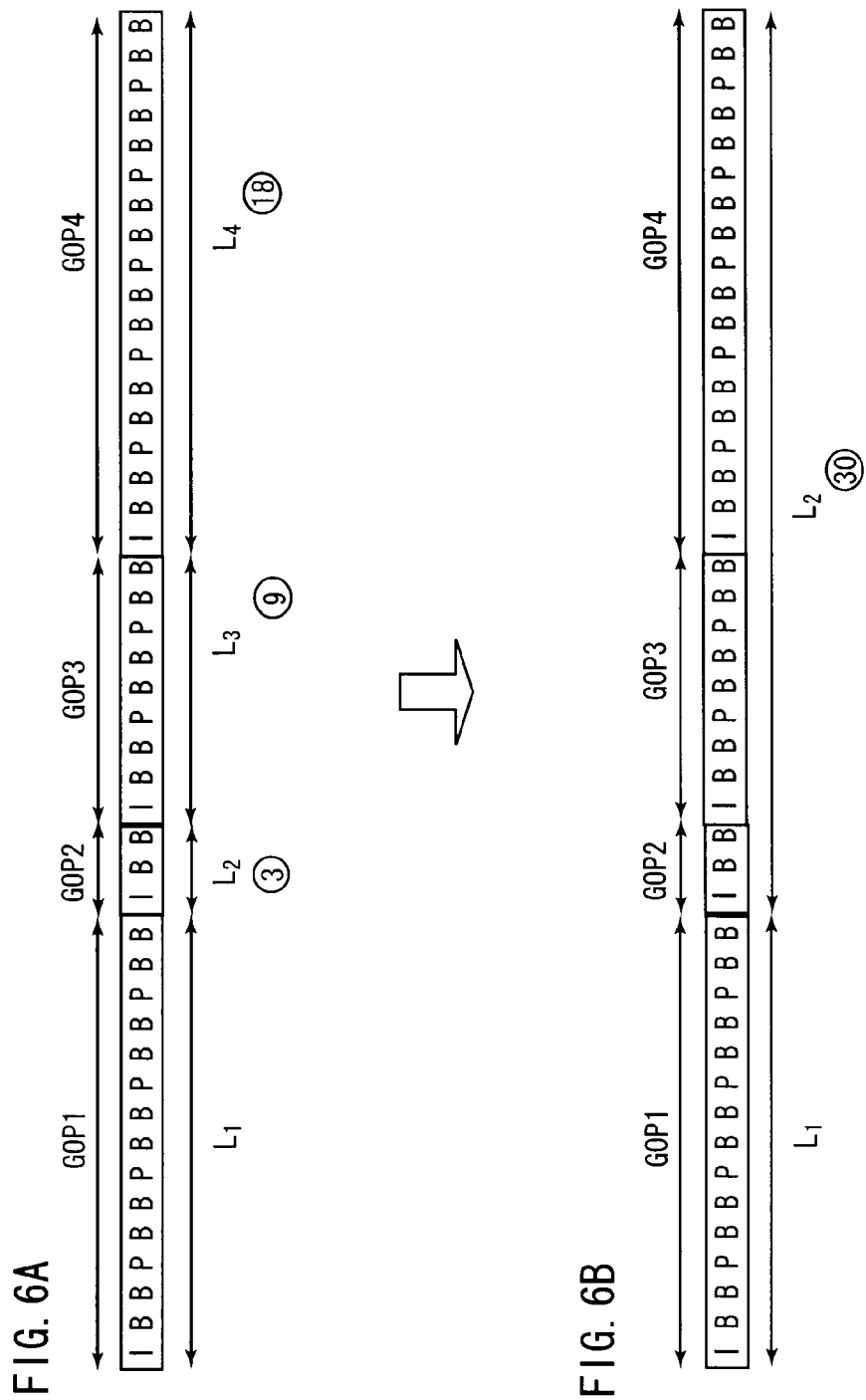

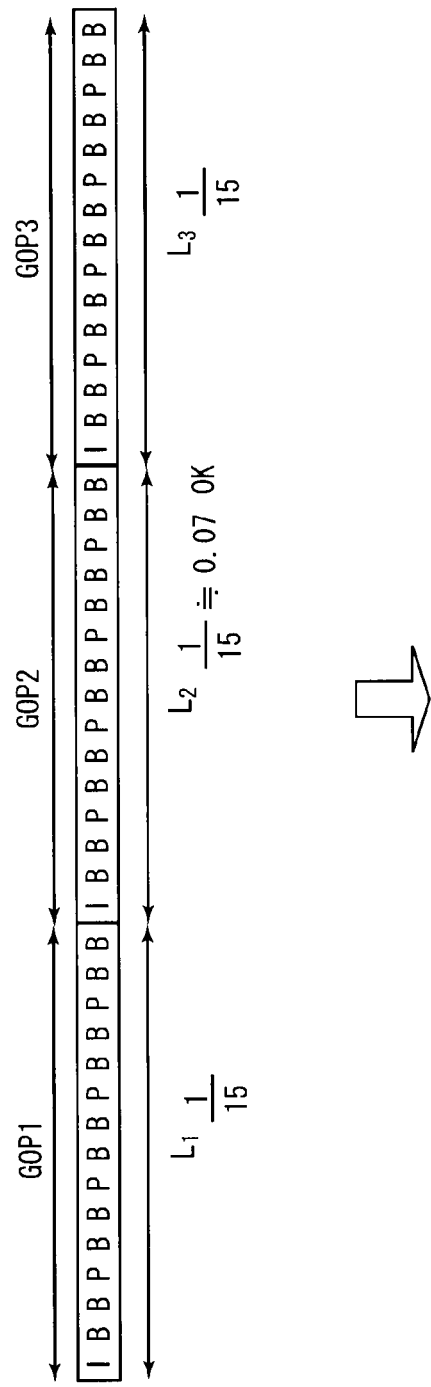
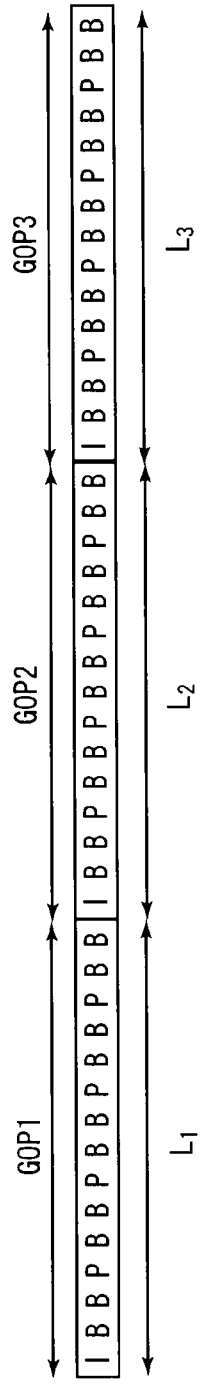
FIG. 7A
FIG. 7B

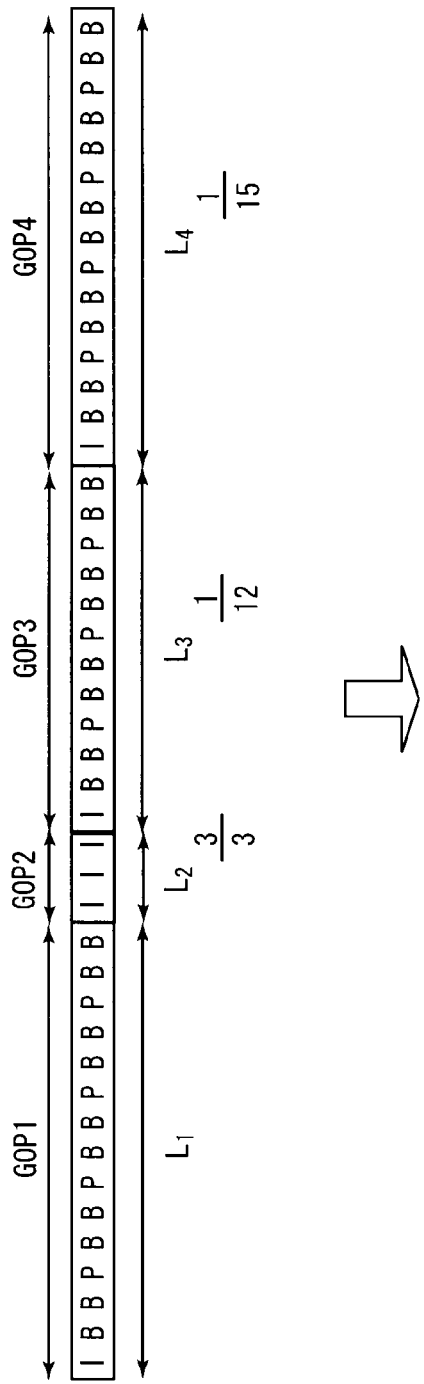
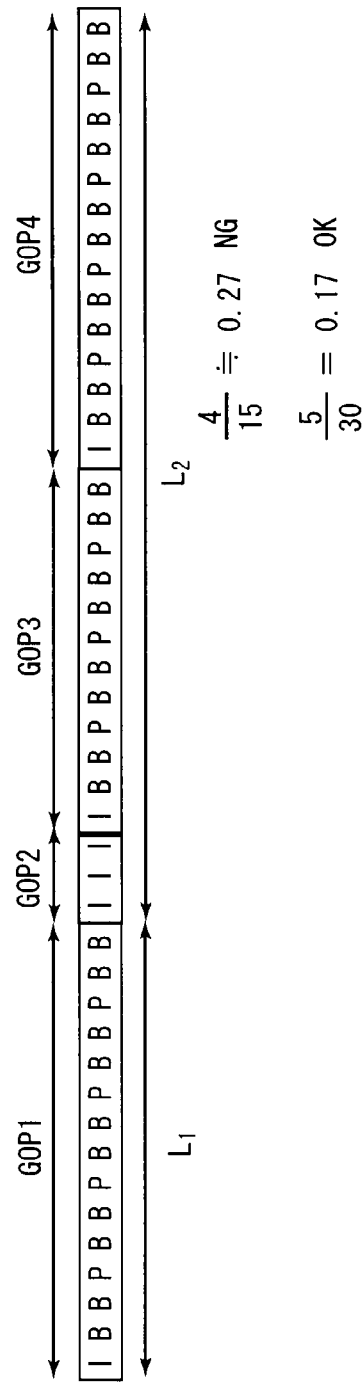
FIG. 8A
FIG. 8B

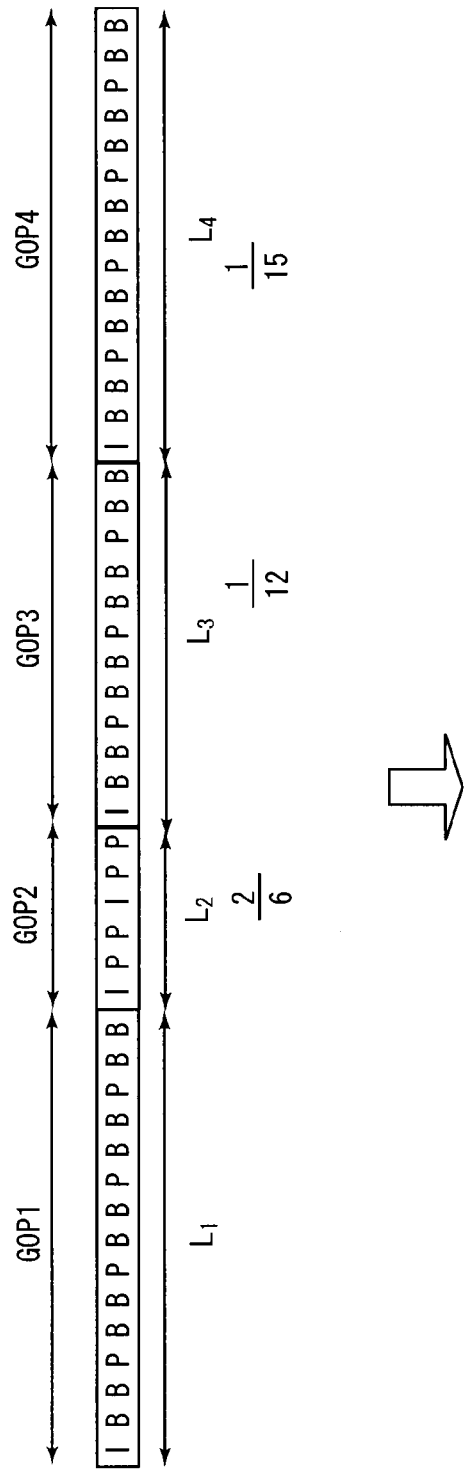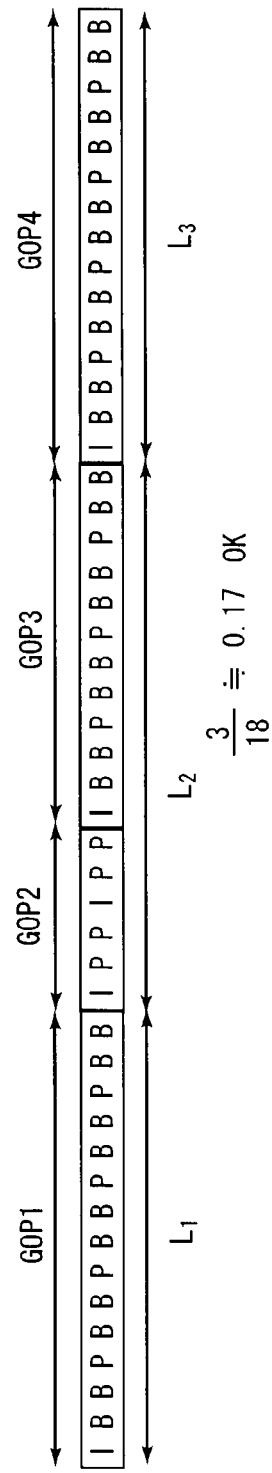

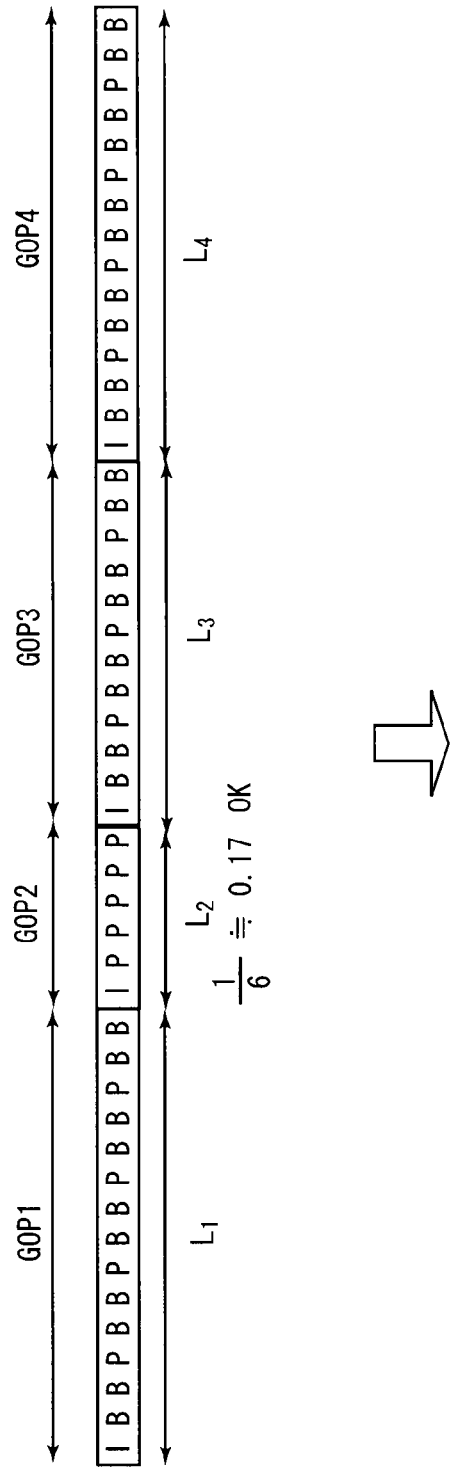
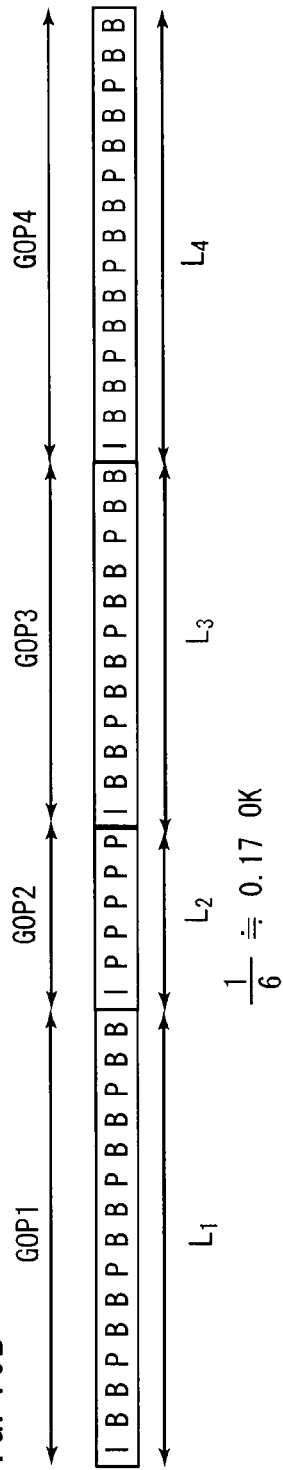
FIG. 10A
FIG. 10B

TRANSCODER FOR CONVERTING A FIRST STREAM TO A SECOND STREAM BASED ON A PERIOD CONVERSION FACTOR

CROSS-REFERENCE TO RELATED APPLICATIONS

This application is a divisional of and is based upon and claims the benefit of priority under 35 U.S.C. §120 for U.S. Ser. No. 12/360,350, filed Jan. 27, 2009, the entire contents of which are incorporated herein by reference and which claims the benefit of priority under 35 U.S.C. §119 from Japanese Patent Application No. 2008-042427, filed Feb. 25, 2008.

BACKGROUND OF THE INVENTION

1. Field of the Invention

The present invention relates to a transcoder for converting an input stream by decoding into a different output stream, and more particularly to a technique to appropriately control the amount of generated codes of the output stream toward a target bit rate.

2. Description of the Background Art

Images to be delivered on digital broadcasts, those to be stored in media such as DVDs and hard disks, and the like are compressed in accordance with various coding systems. The object for such compressions is to avoid constraint on a transmission band, increase the transmission speed, decrease the memory size or the like.

There are various standards for image coding system, such as MPEG2 and H.264. And there is a case where the coding system is converted for the purpose of reducing the amount of codes in a coded image that is inputted, or the like. A transcoder once decodes the inputted coded image. Then, the transcoder codes the decoded image in a different coding system (or the same coding system) again. Thus, the transcoder controls a bit rate of an output stream.

Japanese Patent Application Laid Open Gazette No. 2006-74635 relates to a transcoder for converting an image compressed in a first compressive coding system into an image compressed in a second compressive coding system. This transcoder uses intermediate information generated during the decoding of the image compressed in the first compressive coding system to compress the image in the second compressive coding system.

In the background-art technique for bit rate conversion, the bit rate conversion is performed on the basis of the bit rate in a unit of GOP (Group Of Pictures) of the input stream and the target bit rate in a unit of GOP of the output stream. Namely, a unit of GOP is set as a control unit time of a rate control. This is based on the premise that the picture structure in the GOPs of the input stream is constant to some degree in the whole sequence, and it is not assumed that the bit rate varies sharply on a GOP basis in the input stream.

For this reason, if the number of frames constituting a GOP becomes smaller temporarily at some midpoint in the sequence or if GOPs have a picture structure in which P picture frames or I picture frames are serially inserted, the ratio of the inserted I picture frames in a control unit time becomes high.

In MPEG2, generally, the bit ratio of I, P and B picture frames is I:P:B=5:3:1. Therefore, if the ratio of the inserted I picture frames or P picture frames temporarily becomes high, the bit rate in the control unit time temporarily rises sharply to be higher than the average bit rate of the input stream and the control on rate conversion becomes unstable, disadvantageously.

SUMMARY OF THE INVENTION

The present invention is intended for a transcoder for converting a first stream into a second stream. According to an aspect of the present invention, the transcoder comprises a period determination part for determining a control unit time, a part for acquiring a bit rate of a first stream per determined control unit time, and a quantization step value calculation part for calculating a quantization step value of a second stream by using information on a first stream including an acquired bit rate of a first stream per control unit time, and in the transcoder of the present invention, the period determination part determines each control unit time so that each control unit time has frames of which number is not less than a predetermined value.

By this aspect of the present invention, the variation of the bit rate of the first stream per control unit time can be reduced to be smaller and it is thereby possible to appropriately perform the control on the bit rate.

According to another aspect of the present invention, the transcoder comprises a period determination part for determining a control unit time, a part for acquiring a bit rate of a first stream per determined control unit time, and a quantization step value calculation part for calculating a quantization step value of a second stream by using information on a first stream including an acquired bit rate of a first stream per control unit time, and in the transcoder of the present invention, the period determination part determines each control unit time so that the ratio of I picture frames included in each control unit time becomes not more than a predetermined ratio.

By this aspect of the present invention, the variation of the bit rate of the first stream per control unit time can be reduced to be smaller and it is thereby possible to appropriately perform the control on the bit rate.

Therefore, it is an object of the present invention to appropriately control the amount of generated codes of the output stream toward a target bit rate without large variation of the bit rate of the input stream in the control unit time.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 5A and 5B are views showing another method of correcting the control unit time in accordance with the first preferred embodiment;

FIGS. 6A and 6B are views showing still another method of correcting the control unit time in accordance with the first preferred embodiment;

FIGS. 7A and 7B are views showing a method of correcting the control unit time (exemplary case where no correction is made) in accordance with a second preferred embodiment;

FIGS. 8A and 8B are views showing a method of correcting the control unit time in accordance with the second preferred embodiment;

FIGS. 9A and 9B are views showing another method of correcting the control unit time in accordance with the second preferred embodiment; and FIGS. 10A and 10B are views showing still another method of correcting the control unit time in accordance with the second preferred embodiment.

DESCRIPTION OF THE PREFERRED EMBODIMENTS

{1. Overall Structure of Transcoder}

Figure 1:
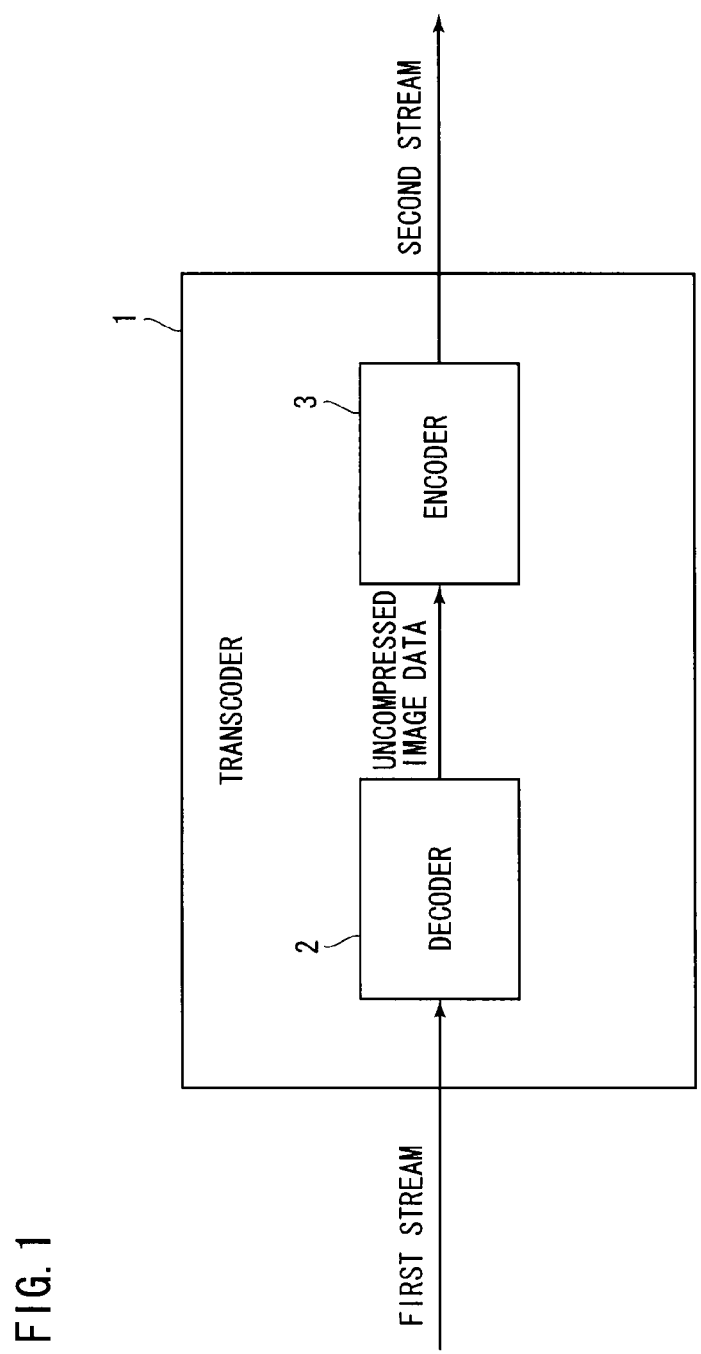
FIG. 1 is a block diagram showing a transcoder.

Hereinafter, the preferred embodiments of the present invention will be discussed, referring to the drawings. FIG. 1 is a block diagram showing a transcoder 1 in accordance with the preferred embodiments. The transcoder 1 comprises a decoder 2 and an encoder 3.

The decoder 2 inputs a first stream. The first stream is a stream of coded image. The decoder 2 decodes the first stream and outputs uncompressed image data to the encoder 3. The encoder 3 recodes the uncompressed image data which is decoded by the decoder 2 and outputs a second stream.

The transcoder 1 converts a coding system of stream, and for example, inputs a first stream coded in MPEG2 and outputs a second stream coded in H.264. The present invention is devised in order to optimally control the rate of the second stream to be outputted in the conversion. Alternatively, the transcoder 1 outputs a stream of the same coding system, and for example, inputs a first stream coded in MPEG2 and outputs a second stream recoded in MPEG2. Also in this case, the present invention is devised in order to optimally control the rate of the second stream to be outputted.

In the rate control methods (A) to (D) discussed later, various computations are performed in the decoder 2 and the encoder 3, and these computations performed in the decoder 2 and the encoder 3 may be implemented by hardware or may be implemented by software operations. In other words, the decoder 2 and the encoder 3 may be constructed as hardware circuits or implemented by a CPU and programs stored in memories. Alternatively, there may be a case where some of the computations are performed by hardware and the others are performed by software.

{2. Rate Control Methods}

Figure 2:
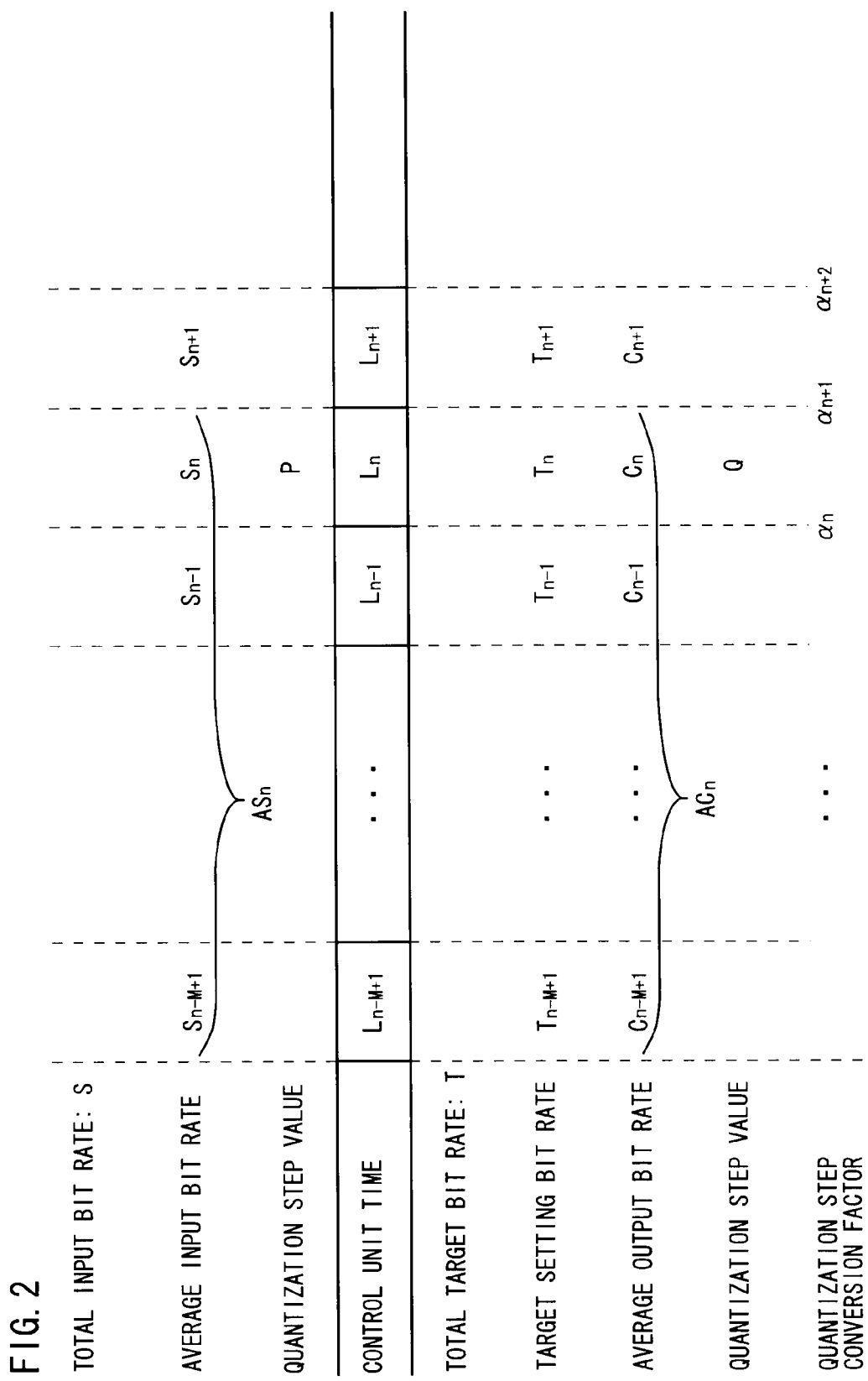
FIG. 2 is a view showing information on an input stream (first stream) and an output stream (second stream) by control unit time.

FIG. 2 is a view showing information on streams that the transcoder 1 inputs or outputs, by control unit time. The transcoder 1 divides the processing time base into control unit times $L_n$ (n=1, 2 . . . ) and performs a rate control by using this control unit time $L_n$ as a unit of processing. In the following discussion, the control unit time $L_n$ is referred to as "the n-th period" as appropriate. In the preferred embodiments of the present invention, though one GOP is set as the control unit time $L_n$, basically, a plurality of successive GOPs are set as the control unit time $L_n$ in accordance with the state of the input stream as discussed later. As the control unit time $L_n$, however, one frame, a plurality of successive frames, or the like may be set.

A total input bit rate S of the first stream is acquired from a sequence header or the like. An average input bit rate $S_n$ is an average bit rate of the first stream in the n period. The transcoder 1 comprises a buffer and can store information on average input bit rates $S_n$ for M periods. Specifically, the buffer can store information on the average input bit rates $S_n$ from the (n−M+1) period to the n period. An average period bit rate $AS_n$ is an average value of the average input bit rates $S_n$ from the (n−M−1) period to the n period. The average period bit rate $AS_n$ is expressed by Eq. 1.

$$AS_n = \frac{1}{M} \sum_{n-M+1}^{n} S_i \quad (Eq. 1)$$

The decoder 2 acquires information on the total input bit rate S, the average input bit rate $S_n$, the average period bit rate $AS_n$, the quantization step value P in the n period or the like from the inputted first stream and outputs these information to the encoder 3. The encoder 3 uses these information to recode the image.

A total target bit rate T of the second stream is set by a user. For example, the user uses a not-shown operation part included in the transcoder 1 to set the total target bit rate T. A target setting bit rate $T_n$ is a target bit rate of the second stream in the n period. An average output bit rate $C_n$ is an average bit rate of the second stream converted in the n period. The transcoder 1 comprises a buffer and can store information on the average output bit rates $C_n$ for M periods. Specifically, the buffer can store information on the average output bit rates $C_n$ from the (n−M+1) period to the n period. An average period bit rate $AC_n$ is an average value of the average output bit rates $C_n$ from the (n−M+1) period to the n period. The average period bit rate $AC_n$ is expressed by Eq. 2. Though the buffer period used for calculation of the average period bit rate $AS_n$ or $AC_n$ is linked to the control unit time $L_n$ in these preferred embodiments, setting of the buffer period is not limited to this case. For example, one past frame at the point of time when coding is finished, a plurality of successive past frames, or the like may be set as the buffer period.

$$AC_n = \frac{1}{M} \sum_{n-M+1}^{n} C_i \quad (Eq. 2)$$

Further, a quantization step conversion factor $\alpha_n$ is a factor calculated at the point of time when the (n−1) period is finished. A quantization step value Q of the second stream is determined by multiplying a value P which is the quantization step value of the first stream or a value P calculated from the quantization step value of the first stream by the quantization step conversion factor $\alpha_n$. This relation is expressed by Eq. 3.

$$Q = \alpha_n P \quad (Eq.3)$$

The initial value $\alpha_1$ of the quantization step conversion factor $\alpha_n$ is given by Eq. 4. Specifically, a value obtained by dividing the total target bit rate T of the second stream by the total input bit rate S of the first stream, i.e., a bit rate ratio, is substituted into function f, to obtain the initial value $\alpha_1$ of the quantization step conversion factor $\alpha_n$.

$$\alpha_1 = f(T/S) \quad (Eq.4)$$

The function f is a function for obtaining a ratio of quantization step values from the ratio of bit rates, and assuming that the ratio of bit rates is $R_B$ and the ratio of quantization step values is $R_Q$, the function f is generally expressed by Eq. 5.

$$R_Q = f(R_B) \quad (Eq.5)$$

A specific example of the function f will be discussed. In these preferred embodiments, as shown in Eq. 6, used are functions controlling the ratio of quantization step values with different features of types I, P and B (I picture, P picture and B picture) of picture or macroblock. In Eq. 6, $f_I(x)$, $f_P(x)$ and $f_B(x)$ are functions corresponding to the I picture, the P picture and the B picture, respectively.

$$\begin{cases} f_I(x) = \varepsilon_I * x^{-\delta_I} = 2.1 * x^{-1.1} \\ f_P(x) = \varepsilon_P * x^{-\delta_P} = 2.1 * x^{-0.8} \\ f_B(x) = \varepsilon_B * x^{-\delta_B} = 1.3 * x^{-0.9} \end{cases} \quad \text{(Eq. 6)}$$

In Eq. 6, as values of $\varepsilon_I$, $\varepsilon_P$, $\varepsilon_B$, $\delta_I$, $\delta_P$ and $\delta_B$ in the case of stream conversion from MPEG2 into H.264, specific numerical values calculated on the basis of an experiment or the like are shown. Specifically, as the result of the experiment, when $\varepsilon_I=2.1$, $\varepsilon_P=2.1$, $\varepsilon_B=1.3$, $\delta_I=1.1$, $\delta_P=0.8$ and $\delta_B=0.9$, an excellent feature can be obtained. Other than this, by using the feature value of the image which is acquired in decoding the input stream, the values of $\varepsilon$ and $\delta$ may be determined. As shown in FIG. 7, for example, on the basis of an activity value (act value) and a motion evaluation value (sad value), the values of $\varepsilon$ and $\delta$ may be determined.

$$\begin{cases} f_I(x) = \varepsilon_I(a, s) * x^{-\delta_I(a,s)} \\ f_P(x) = \varepsilon_P(a, s) * x^{-\delta_P(a,s)} \\ f_B(x) = \varepsilon_B(a, s) * x^{-\delta_B(a,s)} \end{cases} \quad \text{(Eq. 7)}$$

In Eq. 7, "a" represents the act value and "s" represents the sad value, and $\varepsilon_I(a, s)$, $\varepsilon_P(a, s)$, $\varepsilon_B(a, s)$, $-\delta_I(a, s)$, $-\delta_P(a, s)$, $-\delta_B(a, s)$ represent the values of $\varepsilon$ and $\delta$ which are calculated by using the act value and the sad value as parameters.

The activity value is obtained by calculating a differential absolute value sum of an average pixel value in a macroblock and a pixel value of each pixel in the macroblock by macroblock. In other words, the activity value is an evaluation value indicating the degree of dispersion of pixels in the macroblock. This is the same as an activity value used in the code amount control model TM5 of MPEG2 or the like. The motion evaluation value (sad value) is obtained by calculating an interframe differential absolute value sum of a pixel value of each pixel in a reference image macroblock and a pixel value of the corresponding pixel in a macroblock, by macroblock. In other words, the motion evaluation value is obtained by comparing each pixel in a macroblock and the corresponding pixel in the reference image macroblock and calculating an absolute value sum of differentials of pixel values of corresponding pixels in the same coordinate positions.

More generally, assuming that an feature value of an image in the n period is determined as $I_{Ln}$, $f_I(x)$, $f_P(x)$ and $f_B(x)$ are expressed by Eq. 8.

$$\begin{cases} f_I(x) = \varepsilon_I(I_{L_n}) * x^{-\delta_I(I_{L_n})} \\ f_P(x) = \varepsilon_P(I_{L_n}) * x^{-\delta_P(I_{L_n})} \\ f_B(x) = \varepsilon_B(I_{L_n}) * x^{-\delta_B(I_{L_n})} \end{cases} \quad \text{(Eq. 8)}$$

In Eq. 8, $\varepsilon_I(I_{Ln})$, $\varepsilon_P(I_{Ln})$, $\varepsilon_B(I_{Ln})$, $-\delta_I(I_{Ln})$, $-\delta_P(I_{Ln})$ and $-\delta_B(I_{Ln})$ represent the factors $\varepsilon$ and $\delta$ which are determined by using the feature value $I_{Ln}$ of the image as parameters.

Hereafter, four rate control methods (A) to (D) will be discussed.

<2-1. Rate Control Method (A)>

First, on the rate control method (A), a method of calculating the quantization step conversion factor $\alpha_n$ used for calculation of the quantization step value Q of the second stream will be discussed. The transcoder 1 calculates the quantization step conversion factor $\alpha_{n+1}$ after a lapse of the n period.

Eq. 9 is an equation for calculation of the quantization step conversion factor $\alpha_{n+1}$. In Eq. 9, $(T-C_n)$ is obtained by subtracting the average output bit rate $C_n$ of the converted second stream in the n period from the total target bit rate T of the second stream. This value is referred to as a coefficient of variation. In Eq. 9, "k" represents an adjustment factor used for adjusting the coefficient of variation and is a positive value.

$$\alpha_{n+1} = k * (T - C_n) + \alpha_1 \quad \text{(Eq.9)}$$

Thus, the ratio of the quantization step values is adjusted toward a target by adding the coefficient of variation to the initial value $\alpha_1$ obtained by Eq. 4. In this meaning, the initial value $\alpha_1$ of the quantization step conversion factor can be referred to as a reference conversion factor.

After obtaining the quantization step conversion factor $\alpha_{n+1}$ by using Eq. 9, the quantization step value Q of the second stream in the (n+1) period is obtained by using Eq. 3.

For the above calculation of the coefficient of variation in Eq. 9, the average output bit rate $C_n$ in the n period is used. Herein, as shown in Eq. 10, the average period bit rate $AC_n$ from the (n−M+1) period to the n period may be used, instead of the average output bit rate $C_n$.

$$\alpha_{n+1} = k * (T - AC_n) + \alpha_1 \quad \text{(Eq.10)}$$

With Eq. 10, it is possible to gently control the coefficient of variation, without largely depending on local variation of the average output bit rate $C_n$.

Further, for the above calculation of the coefficient of variation in Eq. 9, the value obtained by subtracting the average output bit rate $C_n$ of the converted second stream in the n period from the total target bit rate T of the second stream is used. Herein, as shown in Eq. 11, the value obtained by this subtraction may be further divided by the average input bit rate $S_n$ of the first stream in the n period.

$$\alpha_{n+1} = k * \left( \frac{T - C_n}{S_n} \right) + \alpha_1 \quad \text{(Eq. 11)}$$

With Eq. 11, even if the bit rate of the first stream locally varies significantly, it is possible to avoid a large effect of this on the coefficient of variation.

Further, both the ideas for the methods of calculating the coefficient of variation by using Eqs. 10 and 11 may be taken. Specifically, as shown in Eq. 12, the average period bit rate $AC_n$ is used instead of the average output bit rate $C_n$ and the value obtained by subtraction is divided by the average input bit rate $S_n$. With this, it is possible to more gently control the coefficient of variation.

$$\alpha_{n+1} = k * \left( \frac{T - AC_n}{S_n} \right) + \alpha_1 \quad \text{(Eq. 12)}$$

In Eq. 11, the value obtained by subtracting the average output bit rate $C_n$ from the total target bit rate T is divided by the average input bit rate $S_n$. Instead of this, as shown in Eq. 13, the value obtained by subtraction may be divided by the average period bit rate $AS_n$ of the first stream from the (n−M+1) period to the n period. With this method, it is possible to more gently control the coefficient of variation without any effect of local variation of the bit rate of the first stream.

$$\alpha_{n+1} = k * \left(\frac{T - C_n}{AS_n}\right) + \alpha_1 \quad \text{(Eq. 13)}$$

Further, as shown in Eq. 14, the average period bit rate $AC_n$ may be used instead of the average output bit rate $C_n$ and the average period bit rate $AS_n$ may be used instead of the average input bit rate $S_n$. With this, it is possible to more gently control the coefficient of variation.

$$\alpha_{n+1} = k * \left(\frac{T - AC_n}{AS_n}\right) + \alpha_1 \quad \text{(Eq. 14)}$$

<2-2. Rate Control Method (B)>

Next, the rate control method (B) will be discussed. Also in the rate control method (B), the quantization step conversion factor is calculated and by using Eq. 3, the quantization step value Q of the second stream is calculated. The method of calculating the quantization step conversion factor, however, is different from that in the rate control method (A). In the rate control method (A), the initial value $\alpha_1$ of the quantization step conversion factor is obtained and by using the initial value $\alpha_1$ as the reference conversion factor, the variations from the reference conversion factor are sequentially obtained. On the other hand, in the rate control method (B), at the point of time when the n period is finished, a target setting bit rate $T_{n+1}$ of the second stream in the (n+1) period is determined and by using the determined target setting bit rate $T_{n+1}$, the quantization step conversion factor $\alpha_{n+1}$ in the (n+1) period is calculated.

After determining the target setting bit rate $T_{n+1}$ in the (n+1) period, the quantization step conversion factor $\alpha_{n+1}$ is calculated by the same method as that using Eq. 5. Specifically, by using the function f shown in Eqs. 6 to 8, the quantization step conversion factor $\alpha_{n+1}$ is calculated. More specifically, as shown Eq. 15, by substituting the ratio between the target setting bit rate $T_{n+1}$ in the (n+1) period and the average input bit rate $S_n$ in the n period into the function f, the quantization step conversion factor $\alpha_{n+1}$ is calculated.

$$\alpha_{n+1} = f(T_{n+1}/S_n) \quad \text{(Eq.15)}$$

Alternatively, as shown in Eq. 16 by using the average period bit rate $AS_n$ from the (n−M+1) period to the n period, instead of the average input bit rate $S_n$ in the n period, the quantization step conversion factor $\alpha_{n+1}$ may be calculated.

$$\alpha_{n+1} = f(T_{n+1}/AS_n) \quad \text{(Eq.16)}$$

Eq. 17 is an equation for calculation of the target setting bit rate $T_{n+1}$ in the (n+1) period. In other words, it represents the target setting bit rate $T_{n+1}$ in the (n+1) period calculated by the transcoder 1 at the point of time when the n period is finished. Specifically, assuming that a value obtained by dividing the average output bit rate $C_n$ of the converted second stream in the n period by the target setting bit rate $T_n$ in the n period is determined as a target ratio, the target setting bit rate $T_{n+1}$ in the (n+1) period can be calculated by dividing the total target bit rate T of the second stream by the target ratio.

$$T_{n+1} = k * \frac{T}{\dfrac{C_n}{T_n}} \quad \text{(Eq. 17)}$$

In Eq. 17, "k" is a positive factor and a factor for adjusting the target setting bit rate $T_{n+1}$. Thus, the ratio (target ratio) between the bit rate and the target in the n period is calculated by $C_n/T_n$ and then the total target bit rate T is divided by the target ratio to adjust the target setting bit rate $T_{n+1}$ in the (n+1) period, thereby controlling the bit rate to approximate the target bit rate on the whole.

Though the value obtained by dividing the average output bit rate $C_n$ of the second stream in the n period by the target setting bit rate $T_n$ is used as the target ratio in Eq. 17, this target ratio is further adjusted in Eq. 18.

$$T_{n+1} = k * \frac{T}{\dfrac{S_{n-1}}{S_n} * \dfrac{C_n}{T_n}} \quad \text{(Eq. 18)}$$

In Eq. 18, the target ratio is multiplied by $S_{n-1}/S_n$. This multiplier factor $S_{n-1}/S_n$ is a value obtained by dividing the average input bit rate $S_{n-1}$ of the first stream in the (n−1) period by the average input bit rate $S_n$ of the first stream in the n period and may be referred to as a period ratio of the average input bit rate. Multiplying the target ratio by the period ratio can adjust the target ratio.

Thus, multiplying the target ratio by the period ratio can correct the local variation of the target ratio. For example, if the average input bit rate $S_n$ locally becomes smaller, sometimes the target ratio $C_n/T_n$ accordingly becomes smaller. Also in such a case, multiplying the target ratio $C_n/T_n$ by the period ratio $S_{n-1}/S_n$ (the period ratio is larger than 1 in this case) makes it possible to adjust the target ratio and avoid large variation of the target setting bit rate $T_{n+1}$. Conversely, if the average input bit rate $S_n$ locally becomes larger, the period ratio $S_{n-1}/S_n$ is smaller than 1 and this suppresses sharp increase of the target ratio.

In Eq. 18, the value obtained by dividing the average input bit rate $S_{n-1}$ of the first stream in the (n−1) period by the average input bit rate $S_n$ of the first stream in the n period is used as the period ratio. On the other hand, in the case where the average input bit rate $S_{n+1}$ of the first stream in the (n+1) period can be prefetched, the average input bit rate $S_{n+1}$ may be used. The case where the average input bit rate $S_{n+1}$ can be prefetched is a case where there is enough time to buffer the information on the average input bit rate $S_{n+1}$ and then calculate the target setting bit rate $T_{n+1}$ in the (n+1) period. In other words, this is a case where some processing delay is allowed. Eq. 19 is an equation for calculation of the target setting bit rate $T_{n+1}$ by using the average input bit rate $S_{n+1}$.

$$T_{n+1} = k * \frac{T}{\dfrac{S_n}{S_{n+1}} * \dfrac{C_n}{T_n}} \quad \text{(Eq. 19)}$$

As shown in Eq. 19, as the period ratio used is $S_n/S_{n+1}$ that is, a value obtained by dividing the average input bit rate $S_n$ of the first stream in the n period by the average input bit rate $S_{n+1}$ of the first stream in the (n+1) period. Thus, by using the average input bit rate $S_{n+1}$ of the first stream in the (n+1) period, it is possible to control the target setting bit rate $T_{n+1}$ with higher precision. In other words, it is possible to optimally control the target bit rate by using the latest input information.

In a case where the average input bit rate $S_{n+1}$ of the first stream in the (n+1) period is used as the period ratio, as shown in Eq. 20, instead of Eq. 15, the quantization step conversion factor $\alpha_{n+1}$ in the (n+1) period can be calculated by substituting the ratio between the target setting bit rate $T_{n+1}$ in the (n+1) period and the average input bit rate $S_{n+1}$ in the (n+1) period into the function f.

$$\alpha_{n+1} = f(T_{n+1}/S_{n+1}) \qquad \text{(Eq.20)}$$

Further, in Eq. 18, $S_{n-1}/S_n$ is used as the period ratio. Instead of $S_{n-1}/S_n$, the ratio between the average period bit rate $AS_{n-1}$ of past M periods including the (n−1) period and the average period bit rate $AS_n$ of past M periods including the n period may be used as the period ratio. In other words, in Eq. 18, $AS_{n-1}/AS_n$ may be used, instead of $S_{n-1}/S_n$, as the period ratio. With this, it is possible to decrease the effect of local variation and optimally control the target setting bit rate $T_{n+1}$.

Alternatively, if the average input bit rate $S_{n+1}$ of the first stream in the (n+1) period can be prefetched, the ratio between the average period bit rate $AS_n$ of past M periods including the n period and the average period bit rate $AS_{n+1}$ of past M periods including the (n+1) period may be used as the period ratio. In other words, in Eq. 18, $AS_n/AS_{n+1}$ may be used, instead of $S_{n-1}/S_n$, as the period ratio. With this, it is possible to decrease the effect of local variation and control the target setting bit rate $T_{n+1}$ with higher precision by using the latest input bit rate.

In a case where the average period bit rate $AS_{n+1}$ of past M periods including the (n+1) period is used as the period ratio, as shown in Eq. 21, instead of Eq. 16, the quantization step conversion factor $\alpha_{n+1}$ in the (n+1) period can be calculated by substituting the ratio between the target setting bit rate $T_{n+1}$ in the (n+1) period and the average period bit rate $AS_{n+1}$ of past M periods including the (n+1) period into the function f.

$$\alpha_{n+1} = f(T_{n+1}/AS_{n+1}) \qquad \text{(Eq.21)}$$

Further, though the method of calculating the target setting bit rate $T_{n+1}$ of the rate control method (B) has been discussed by using Eqs. 17, 18, 19 and the like, in all the cases discussed in the above rate control method (B) including the case discussed by using these equations, the average period bit rate $AC_n$ from the (n−M+1) period to the n period may be used instead of the average output bit rate $C_n$ in the n period. For example, in Eqs. 17, 18, 19 and the like, $AC_n$ is used instead of $C_n$. This makes it possible to more gently control the target setting bit rate $T_{n+1}$.

<2-3. Rate Control Method (C)>

Next, the rate control method (C) will be discussed. Also in the rate control method (C), the quantization step conversion factor is calculated, and by using Eq. 3, the quantization step value Q of the second stream is calculated. Further, in the rate control method (C), like in the rate control method (B), the target setting bit rate $T_{n+1}$ of the second stream in the (n+1) period is determined at the point of time when the n period is finished, and by using the determined target setting bit rate $T_{n+1}$, the quantization step conversion factor $\alpha_{n+1}$ in the (n+1) period is calculated.

After determining the target setting bit rate $T_{n+1}$ in the (n+1) period, the quantization step conversion factor $\alpha_{n+1}$ is calculated in the same method as that discussed by using Eq. 5. In other words, by using the function f shown in Eqs. 6 to 8, the quantization step conversion factor $\alpha_{n+1}$ is calculated. Specifically, as shown in Eq. 15, the quantization step conversion factor $\alpha_{n+1}$ is calculated by substituting the ratio between the target setting bit rate $T_{n+1}$ in the (n+1) period and the average input bit rate $S_n$ in the n period into the function f. Alternatively, as shown in Eq. 16, the quantization step conversion factor $\alpha_{n+1}$ may be calculated by using the average period bit rate $AS_n$ from the (n−M+1) period to the n period, instead of the average input bit rate $S_n$.

Eq. 22 is an equation for calculation of the target setting bit rate $T_{n+1}$ in the (n+1) period. In other words, it represents the target setting bit rate $T_{n+1}$ in the (n+1) period calculated by the transcoder 1 at the point of time when the n period is finished. Specifically, assuming that a value obtained by subtracting the average output bit rate $C_n$ of the converted second stream in the n period from the target setting bit rate $T_n$ in the n period is determined as a target difference, the target setting bit rate $T_{n+1}$ in the (n+1) period can be calculated by adding the target difference to the total target bit rate T of the second stream.

$$T_{n+1} = T + k*(T_n - C_n) \qquad \text{(Eq.22)}$$

In Eq. 22, "k" is a positive factor and a factor for adjusting the target setting bit rate $T_{n+1}$. Thus, the difference between the bit rate and the target in the n period is calculated by $(T_n - C_n)$ and then the target difference is added to the total target bit rate T, to thereby control the output stream to approximate the target bit rate.

Though the value obtained by subtracting the average output bit rate $C_n$ of the second stream in the n period from the target setting bit rate $T_n$ in the n period is used as the target difference in Eq. 22, this target difference is further adjusted in Eq. 23.

$$T_{n+1} = T + k * \frac{S_n}{S_{n-1}} * (T_n - C_n) \qquad \text{(Eq. 23)}$$

In Eq. 23, the target difference is multiplied by $S_n/S_{n-1}$. This multiplier factor $S_n/S_{n-1}$ is the period ratio obtained by dividing the average input bit rate $S_n$ of the first stream in the n period by the average input bit rate $S_{n-1}$ of the first stream in the (n−1) period. Multiplying the target difference by the period ratio can adjust the target difference.

Thus, multiplying the target difference by the period ratio can correct the local variation of the target difference. For example, if the average input bit rate $S_n$ in the n period locally becomes smaller than that in the (n−1) period, sometimes the target difference $(T_n - C_n)$ accordingly varies largely. Also in such a case, multiplying the target difference $(T_n - C_n)$ by the period ratio $S_n/S_{n-1}$ (the period ratio is smaller than 1 in this case) makes it possible to adjust the target difference and avoid large variation of the target setting bit rate $T_{n+1}$.

In Eq. 23, the value obtained by dividing the average input bit rate $S_n$ of the first stream in the n period by the average input bit rate $S_{n-1}$ of the first stream in the (n−1) period is used as the period ratio. On the other hand, in the case where the average input bit rate $S_{n+1}$ of the first stream in the (n+1) period can be prefetched, the average input bit rate $S_{n+1}$ may be used. The case where the average input bit rate $S_{n+1}$ can be prefetched is, as discussed above, a case where there is enough time to buffer the information on the average input bit rate $S_{n+1}$ and then calculate the target setting bit rate $T_{n+1}$ in the (n+1) period. In this case, in Eq. 23, $S_{n+1}/S_n$ is used, instead of $S_n/S_{n-1}$, as the period ratio. Thus, by using the average input bit rate $S_{n+1}$ of the first stream in the (n+1) period, it is possible to control the target setting bit rate $T_{n+1}$ with higher precision.

In a case where the average input bit rate $S_{n+1}$ of the first stream in the (n+1) period is used as the period ratio, as shown in Eq. 20, instead of Eq. 15, the quantization step conversion factor $\alpha_{n+1}$ in the (n+1) period can be calculated by substituting the ratio between the target setting bit rate $T_{n+1}$ in the (n+1) period and the average input bit rate $S_{n+1}$ in the (n+1) period into the function f.

Further, in Eq. 23, $S_n/S_{n-1}$ is used as the period ratio. Instead of $S_n/S_{n-1}$, the ratio between the average period bit rate $AS_n$ of past M periods including the n period and the average period bit rate $AS_{n-1}$ of past M periods including the (n−1) period may be used as the period ratio. In other words, in Eq. 23, $AS_n/AS_{n-1}$ may be used, instead of $S_n/S_{n-1}$, as the period ratio. With this, it is possible to decrease the effect of local variation and optimally control the target setting bit rate $T_{n+1}$.

Alternatively, if the average input bit rate $S_{n+1}$ of the first stream in the (n+1) period can be prefetched, the ratio between the average period bit rate $AS_{n+1}$ of past M periods including the (n+1) period and the average period bit rate $AS_n$ of past M periods including the n period may be used as the period ratio. In other words, in Eq. 23, $AS_{n+1}/AS_n$ may be used, instead of $S_n/S_{n-1}$, as the period ratio. With this, it is possible to decrease the effect of local variation and control the target setting bit rate $T_{n+1}$ with higher precision by using the latest input bit rate.

In a case where the average period bit rate $AS_{n+1}$ of past M periods including the (n+1) period is used as the period ratio, as shown in Eq. 21, instead of Eq. 16, the quantization step conversion factor $\alpha_{n+1}$ in the (n+1) period can be calculated by substituting the ratio between the target setting bit rate $T_{n+1}$ in the (n+1) period and the average period bit rate $AS_{n+1}$ of past M periods including the (n+1) period into the function f.

Further, though the method of calculating the target setting bit rate $T_{n+1}$ of the rate control method (C) has been discussed by using Eqs. 22, 23 and the like, in all the calculation methods discussed in the rate control method (C) including the cases discussed by using these equations, the average period bit rate $AC_n$ from the (n−M+1) period to the n period may be used instead of the average output bit rate $C_n$ in the n period. For example, in Eqs. 22, 23 and the like, $AC_n$ may be used instead of $C_n$. This makes it possible to more gently control the target setting bit rate $T_{n+1}$.

<2-4. Rate Control Method (D)>

Next, the rate control method (D) will be discussed. Also in the rate control method (D), like in the rate control method (C), the target setting bit rate $T_{n+1}$ of the second stream in the (n+1) period is determined at the point of time when the n period is finished, and by using the determined target setting bit rate $T_{n+1}$, the quantization step conversion factor $\alpha_{n+1}$ in the (n+1) period is calculated. In the rate control method (D), the method of determining the target setting bit rate $T_{n+1}$ of the second stream in the (n+1) period is different from that of the rate control method (C).

Eq. 24 is an equation for calculation of the target setting bit rate $T_{n+1}$ in the (n+1) period. Like in the rate control method (C), the value obtained by subtracting the average output bit rate $C_n$ of the converted second stream in the n period from the target setting bit rate $T_n$ in the n period is used as the target difference. Though the target difference is adjusted, however, by multiplying the target difference by the period ratio in the rate control method (C), the target difference is multiplied by a period difference in the rate control method (D), as shown in Eq. 24.

$$T_{n+1}=T+k*(S_n-S_{n-1})*(T_n-C_n) \quad (Eq.24)$$

In Eq. 24, the target difference is multiplied by $(S_n-S_{n-1})$. This multiplier factor $(S_n-S_{n-1})$ is the period difference obtained by subtracting the average input bit rate $S_{n-1}$ of the first stream in the (n−1) period from the average input bit rate $S_n$ of the first stream in the n period. Multiplying the target difference by the period difference can adjust the target difference. In Eq. 24, the factor "k" is a positive factor for adjusting the target setting bit rate $T_{n+1}$.

Thus, multiplying the target difference by the period difference can correct the local variation of the target difference. For example, if the average input bit rate $S_n$ gradually becomes smaller, sometimes the average output bit rate $C_n$ accordingly becomes smaller and target difference $(T_n-C_n)$ becomes a positive value. Also in such a case, the period difference $(S_n-S_{n-1})$ becomes a negative value, to thereby make such a correction that the target setting bit rate $T_{n+1}$ should not be set larger. In other words, if the average input bit rate $S_n$ becomes smaller, contrary to this variation, the target setting bit rate $T_{n+1}$ is controlled not to become larger.

In the method of calculating the target setting bit rate $T_{n+1}$ discussed by using Eq. 24, the target difference $(T_n-C_n)$ is multiplied by the period difference. On the other hand, as shown in Eq. 25, the period difference may be added to the target difference. In Eq. 25, "h" is a positive factor for adjusting the target setting bit rate $T_{n+1}$. Thus, by adding the period difference to the target difference, it is possible to control the target setting bit rate $T_{n+1}$ with a feature different from that in the case of multiplication.

$$T_{n+1}=T+h*(S_n-S_{n-1})+k*(T_n-C_n) \quad (Eq.25)$$

In Eq. 24, the value obtained by subtracting the average input bit rate $S_{n-1}$ of the first stream in the (n−1) period from the average input bit rate $S_n$ of the first stream in the n period is used as the period difference. Then, the target difference is multiplied by the period difference. On the other hand, in the case where the average input bit rate $S_{n+1}$ of the first stream in the (n+1) period can be prefetched, the average input bit rate $S_{n+1}$ may be used. In this case, in Eq. 24, $(S_{n+1}-S_n)$ is used, instead of $(S_n-S_{n-1})$, as the period difference. Thus, by using the average input bit rate $S_{n+1}$ of the first stream in the (n+1) period, it is possible to control the target setting bit rate $T_{n+1}$ with higher precision.

Also in Eq. 25, the value obtained by subtracting the average input bit rate $S_{n-1}$ of the first stream in the (n−1) period from the average input bit rate $S_n$ of the first stream in the n period is used as the period difference. Then, the period difference is added to the target difference. On the other hand, in the case where the average input bit rate $S_{n+1}$ of the first stream in the (n+1) period can be prefetched, the average input bit rate $S_{n+1}$ may be used. In this case, in Eq. 25, $(S_{n+1}-S_n)$ is used, instead of $(S_n-S_{n-1})$, as the period difference. Thus, by using the average input bit rate $S_{n+1}$ of the first stream in the (n+1) period, it is possible to control the target setting bit rate $T_{n+1}$ with higher precision.

In a case where the average input bit rate $S_{n+1}$ of the first stream in the (n+1) period is used as the period difference, as shown in Eq. 20, the quantization step conversion factor $\alpha_{n+1}$ in the (n+1) period can be calculated by substituting the ratio between the target setting bit rate $T_{n+1}$ in the (n+1) period and the average input bit rate $S_{n+1}$ in the (n+1) period into the function f.

In Eqs. 24 and 25, $(S_n-S_{n-1})$ is used as the period difference. Instead of this period difference, the difference between the average period bit rate $AS_n$ of past M periods including the n period and the average period bit rate $AS_{n-1}$ of past M periods including the (n−1) period may be used as the period difference. In other words, in Eqs. 24 and 25, $(AS_n-AS_{n-1})$ may be used, instead of $(S_n-S_{n-1})$, as the period difference. With this, it is possible to decrease the effect of local variation and optimally control the target setting bit rate $T_{n+1}$.

Alternatively, if the average input bit rate $S_{1+1}$ of the first stream in the (n+1) period can be prefetched, the ratio between the average period bit rate $AS_{n+1}$ of past M periods including the (n+1) period and the average period bit rate $AS_n$ of past M periods including the n period may be used as the period difference. In other words, in Eqs. 24 and 25, $(AS_{n+1}-AS_n)$ may be used, instead of $(S_n-S_{n-1})$, as the period difference. With this, it is possible to decrease the effect of local variation and control the target setting bit rate $T_{n+1}$ with higher precision by using the latest input bit rate.

In a case where the average period bit rate $AS_{n+1}$ of past M periods including the (n+1) period is used as the period difference, as shown in Eq. 21, the quantization step conversion factor $\alpha_{n+1}$ in the (n+1) period can be calculated by substituting the ratio between the target setting bit rate $T_{n+1}$ in the (n+1) period and the average period bit rate $AS_{n-1}$ of past M periods including the (n+1) period into the function f.

Further, though the method of calculating the target setting bit rate $T_{n+1}$ of the rate control method (D) has been discussed by using Eqs. 24, 25 and the like, in all the calculation methods discussed in the rate control method (D) including the cases discussed by using these equations, the average period bit rate $AC_n$ from the (n−M+1) period to the n period may be used instead of the average output bit rate $C_n$ in the n period. For example, in Eqs. 24, 25 and the like, $AC_n$ may be used instead of $C_n$. This makes it possible to more gently control the target setting bit rate $T_{n+1}$.

{3. Method of Determining Control Unit Time}

Next, discussion will be made on a method of determining the control unit time. As discussed above, in the rate control methods (A) to (D), the average input bit rate $S_n$ in the control unit time $L_n$ is used in the process of calculating the quantization step value Q. Alternatively, the average input bit rate $S_{n-1}$ or $S_{n+1}$ in the control unit time $L_{n-1}$ or $L_{n+1}$ is used. Further, the average period bit rate $AS_n$ or the like is used.

In the preferred embodiments of the present invention, as discussed above, one GOP period is used basically as the control unit time $L_n$. If the number of frames in one GOP is small or the ratio of I picture frames in one GOP is high, however, there is a possibility that the average input bit rate $S_n$ may become high sharply. Then, in such a case, the transcoder 1 of the preferred embodiments corrects the control unit time $L_n$ to reduce variation of the average input bit rate $S_n$.

<3-1. The First Preferred Embodiment>

On the method of correcting the control unit time, the first preferred embodiment will be discussed. The decoder 2, first, acquires the number of frames included in an inputted GOP. Then, if the number of frames included in the GOP is not less than a predetermined threshold value, it is determined, with respect to the GOP, that one GOP serves as a control unit time $L_n$. On the other hand, if the number of frames included in the GOP is less than the predetermined threshold value, the GOP is connected to the following GOP so that the number of frames included in the two connected GOPs can become not less than the predetermined threshold value. If the number of frames included in the two connected GOPs is less than the predetermined threshold value, the following GOP is further connected to the connected GOPs. Thus, the GOPs are connected to one another until the number of frames included in the connected GOPs becomes not less than the predetermined threshold value and it is determined that the connected GOPs serve as one control unit time.

With reference to the exemplary cases shown in FIGS. 3A and 3B to 6A and 6B, correction of the control unit time will be discussed. In FIGS. 3A and 3B to 6A and 6B, the upper FIGS. 3A, 4A, 5A and 6A show cases where the GOPs of the input streams are in a one-to-one correspondence with the control unit times. On the other hand, the lower FIGS. 3B, 4B, 5B and 6B show cases where the control unit times are corrected by using the methods of determining the control unit times of the first preferred embodiment after the input streams having the same picture structures as those in the respective upper figures are inputted. In FIGS. 3A and 3B to 6A and 6B, the threshold value of the number of frames is set to 15. Specifically, if the number of frames in the GOP is less than 15, GOPs are connected until the number of frames becomes not less than 15, to correct the control unit time.

Figures 3A, 3B:
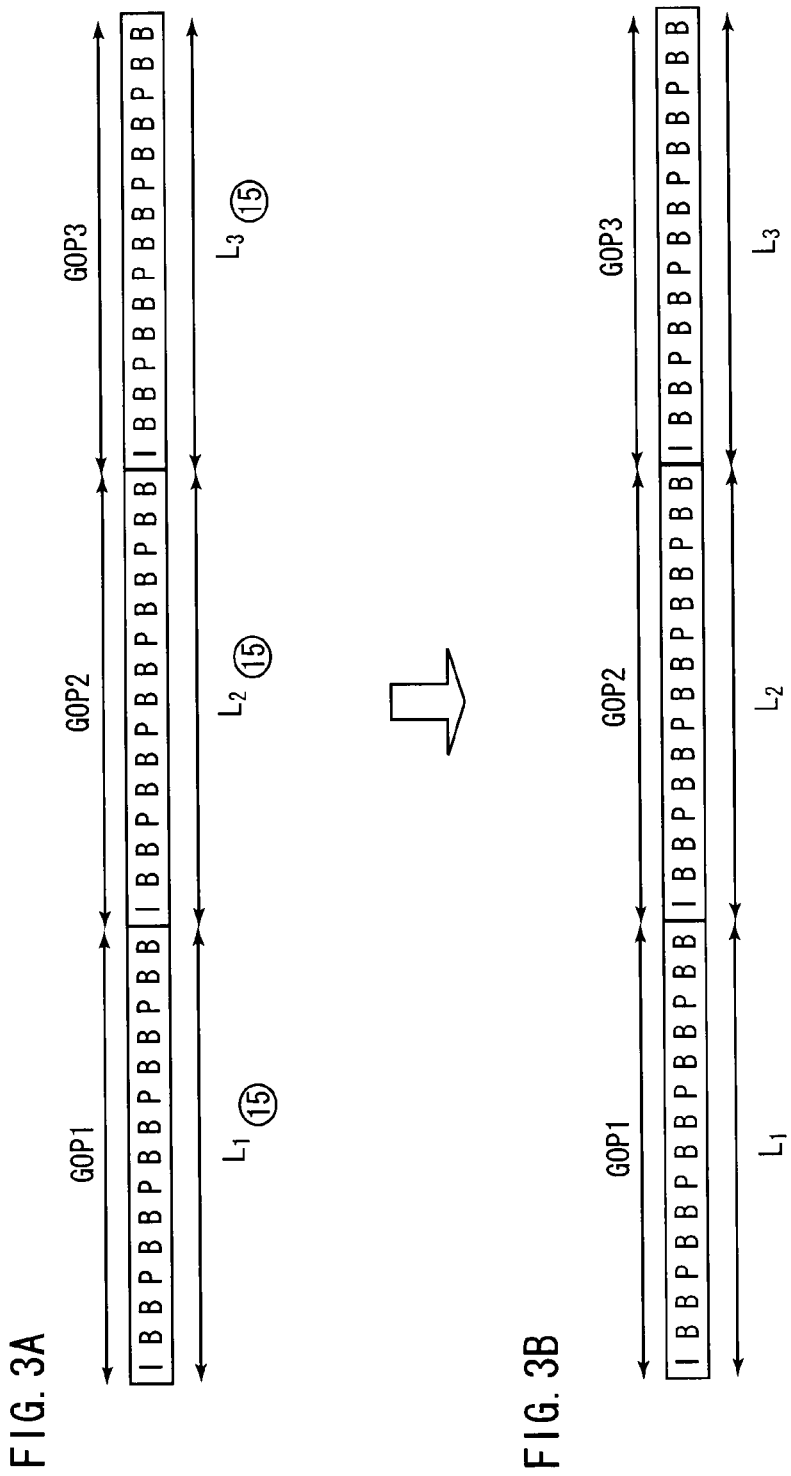
FIGS. 3A and 3B are views showing a method of correcting the control unit time (exemplary case where no correction is made) in accordance with a first preferred embodiment.

The exemplary case shown in FIGS. 3A and 3B will be discussed. This case is the most general one. Each of the GOP1 to the GOP3 consists of 15 frames. Specifically, each of the GOP1 to the GOP3 has a basic picture structure "IBBPBBPBBPBBPBB". Therefore, both in FIGS. 3A and 3B, the GOP1 to the GOP3 correspond to the control unit times $L_1$ to $L_3$, respectively. In other words, in this case, the control unit time is a unit of one GOP and not corrected.

The exemplary case shown in FIGS. 4A and 4B will be discussed. In this case, the GOP1 and the GOP4 each have the basic picture structure "IBBPBBPBBPBBPBB", consisting of 15 frames. The GOP2, however, has a picture structure "IBB" and the number of frames is 3. The GOP3 has a picture structure "IBBPBBPBBPBB" and the number of frames is 12.

Figure 4A:
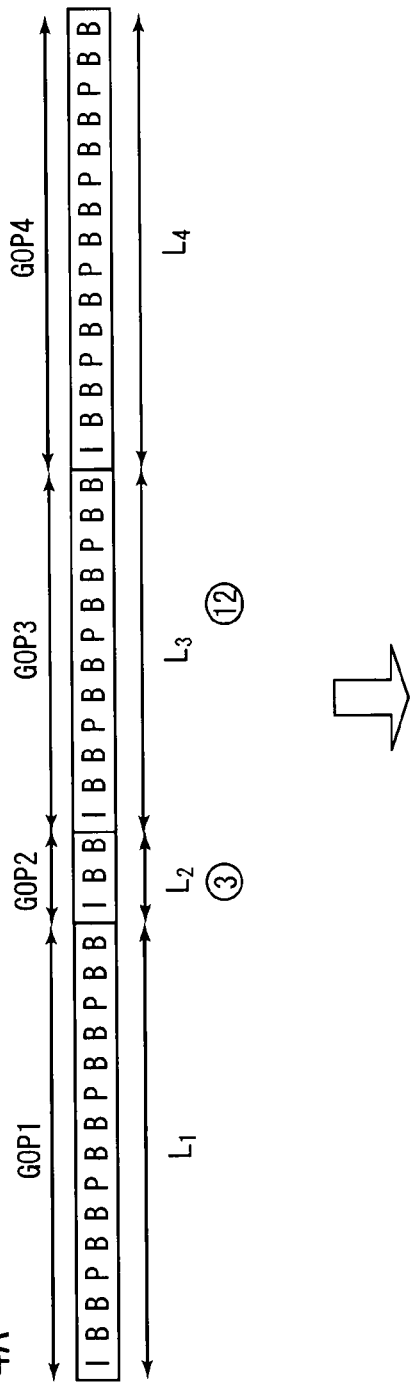
FIGS. 4A and 4B are views showing a method of correcting the control unit time in accordance with the first preferred embodiment.
Figure 4B:
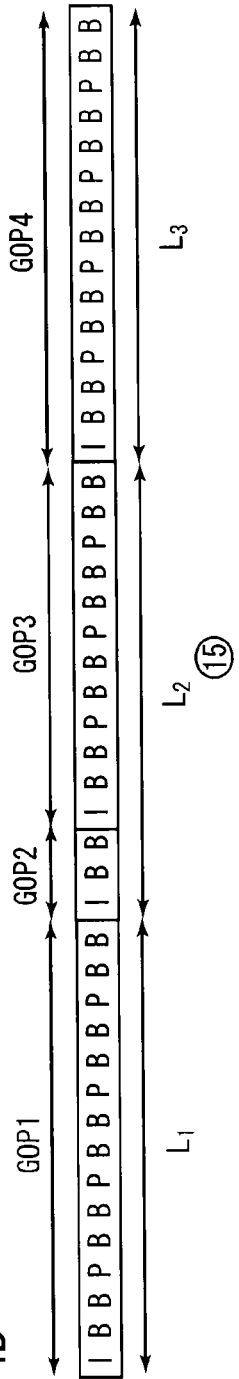

If the GOP1 to the GOP4 correspond to the control unit times $L_1$ to $L_4$, respectively, like in FIG. 4A, the respective values of the average input bit rates $S_2$ and $S_3$ of the control unit times $L_2$ and $L_3$ become high sharply. Then, as shown in FIG. 4B, the GOP2 and the GOP3 are connected to each other, to determine one control unit time $L_2$. With this connection, the number of frames in the control unit time $L_2$ becomes 15 and the variation of the average input bit rate $S_n$ can be reduced to be smaller.

The exemplary case shown in FIGS. 5A and 5B will be discussed. In this case, the GOP1, the GOP3 and the GOP4 each have the basic picture structure "IBBPBBPBBPBBPBB", consisting of 15 frames. The GOP2, however, has a picture structure "IBB" and the number of frames is 3.

If the GOP1 to the GOP4 correspond to the control unit times $L_1$ to $L_4$, respectively, like in FIG. 5A, the value of the average input bit rate $S_2$ of the control unit time $L_2$ becomes high sharply. Then, as shown in FIG. 5B, the GOP2 and the GOP3 are connected to each other, to determine one control unit time $L_2$. With this connection, the number of frames in the control unit time $L_2$ becomes 18 and the variation of the average input bit rate $S_n$ can be reduced to be smaller. Thus, though the number of frames in the GOP3 is 15 and the condition for the control unit time is satisfied, since the number of frames in the GOP2 is smaller, the GOP3 is connected to the GOP2, to correct the control unit time. As a result, though the number of frames in the control unit time $L_2$ becomes 18, which is larger than the number of frames in other control unit times, there is no problem in terms of reduction of the variation of the average input bit rate $S_n$.

The exemplary case shown in FIGS. 6A and 6B will be discussed. In this case, the GOP1 has the basic picture structure "IBBPBBPBBPBBPBB", consisting of 15 frames. The GOP2, however, has a picture structure "IBB" and the number of frames is 3. The GOP3 has a picture structure "IBBPBBPBB" and the number of frames is 9, and the GOP4 has a picture structure "IBBPBBPBBPBBPBBPBB" and the number of frames is 18.

If the GOP1 to the GOP4 correspond to the control unit times $L_1$ to $L_4$, respectively, like in FIG. 6A, the respective values of the average input bit rates $S_2$ and $S_3$ of the control unit times $L_2$ and $L_3$ become high sharply. Then, as shown in FIG. 6B, the GOP2, the GOP3 and the GOP4 are connected to one another, to determine one control unit time $L_2$. With this connection, the number of frames in the control unit time $L_2$ becomes 30 and the variation of the average input bit rate $S_n$ can be reduced to be smaller. Thus, if the number of frames is less than 15 after the two GOPs are connected to each other, the following GOP is further connected thereto, to thereby reduce the variation of the average input bit rate $S_n$.

Though the case where the control unit times are connected on a GOP basis has been discussed in the first preferred embodiment, the control unit times may be corrected on a frame basis.

Thus, in the first preferred embodiment, the control unit time is corrected adaptively in accordance with the number of frames included in the GOPs of the input stream. This can reduce the variation of the average input bit rate $S_n$, and with the constant average input bit rate $S_n$, it is possible to perform an optimal rate control.

<3-2. The Second Preferred Embodiment>

On the method of correcting the control unit time, the second preferred embodiment will be discussed. The decoder 2, first, acquires the number of I picture frames included in an inputted GOP. Then, if the ratio of the I picture frames included in the GOP is not more than a predetermined threshold value, it is determined, with respect to the GOP, that one GOP serves as a control unit time $L_n$. On the other hand, if the ratio of the I picture frames included in the GOP exceeds the predetermined threshold value, the GOP is connected to the following GOP so that the ratio of the I picture frames included in the two connected GOPs can become not more than the predetermined threshold value. If the ratio of the I picture frames included in the two connected GOPs exceeds the predetermined threshold value, the following GOP is further connected to the connected GOPs. Thus, the GOPs are connected to one another until the ratio of the I picture frames included in the connected GOPs becomes not more than the predetermined threshold value and it is determined that the connected GOPs serve as one control unit time.

With reference to the exemplary cases shown in FIGS. 7A and 7B to 10A and 10B, correction of the control unit time will be discussed. In FIGS. 7A and 7B to 10A and 10B, the upper FIGS. 7A, 8A, 9A and 10A show cases where the GOPs of the input streams are in a one-to-one correspondence with the control unit times. On the other hand, the lower FIGS. 7B, 8B, 9B and 10B show cases where the control unit times are corrected by using the methods of determining the control unit times of the second preferred embodiment after the input streams having the same picture structures as those in the respective upper figures are inputted. In FIGS. 7A and 7B to 10A and 10B, the threshold value of the ratio of I picture frames is set to 0.2. Specifically, if the ratio of the I picture frames included in the GOP exceeds 0.2, GOPs are connected until the ratio of the I picture frames becomes not more than 0.2, to correct the control unit time.

The exemplary case shown in FIGS. 7A and 7B will be discussed. This case is the most general one. Each of the GOP1 to the GOP3 consists of 15 frames and each of the GOP1 to the GOP3 has a picture structure "IBBPBBPBBPBBPBB". In each of the GOP1 to the GOP3, the ratio of the I picture frames is $1/15 \approx 0.07$. Therefore, both in FIGS. 7A and 7B, the GOP1 to the GOP3 correspond to the control unit times $L_1$ to $L_3$, respectively. In other words, in this case, the control unit time is a unit of one GOP and not corrected.

The exemplary case shown in FIGS. 8A and 8B will be discussed. In this case, the GOP1 and the GOP4 each have the basic picture structure "IBBPBBPBBPBBPBB", consisting of 15 frames, and the ratio of the I picture frames is $1/15 \approx 0.07$. The GOP2, however, has a picture structure "III" and the number of frames is 3. The ratio of the I picture frames is $3/3=1$. The GOP3 has a picture structure "IBBPBBPBBPBB" and the number of frames is 12.

If the GOP1 to the GOP4 correspond to the control unit times $L_1$ to $L_4$, respectively, like in FIG. 8A, the value of the average input bit rate $S_2$ of the control unit time $L_2$ becomes high sharply. Then, as shown in FIG. 8B, the GOP2, the GOP3 and the GOP4 are connected to one another, to determine one control unit time $L_2$. Even if the GOP2 and the GOP3 are connected to each other, the ratio of the I picture frames is $4/15 \approx 0.27$, exceeding the threshold value of 0.2. With connection of the three GOPs, the number of frames in the control unit time $L_2$ becomes 30 and the ratio of the I picture frames becomes $5/30 \approx 0.17$. This reduces the variation of the average input bit rate $S_n$ to be smaller.

The exemplary case shown in FIGS. 9A and 9B will be discussed. In this case, the GOP1 and the GOP4 each have the basic picture structure "IBBPBBPBBPBBPBB", consisting of 15 frames. The GOP2, however, has a picture structure "IPPIPP" and the ratio of the I picture frames is $2/6 \approx 0.33$. The GOP3 has a picture structure "IBBPBBPBBPBB".

If the GOP1 to the GOP4 correspond to the control unit times $L_1$ to $L_4$, respectively, like in FIG. 9A, the value of the average input bit rate $S_2$ of the control unit time $L_2$ becomes high sharply. Then, as shown in FIG. 9B, the GOP2 and the GOP3 are connected to each other, to determine one control unit time $L_2$. With this connection, the ratio of the I picture frames in the control unit time $L_2$ becomes $3/18 \approx 0.17$ and the variation of the average input bit rate $S_n$ can be reduced to be smaller.

The exemplary case shown in FIGS. 10A and 10B will be discussed. In this case, the GOP1 and the GOP4 each have the basic picture structure "IBBPBBPBBPBBPBB", consisting of 15 frames. The GOP2, however, has a picture structure "IPPPPP" and the ratio of the I picture frames is $1/6 \approx 0.17$, not more than the threshold value of 0.2. The GOP3 has a picture structure "IBBPBBPBB" and the ratio of the I picture frames is not more than 0.2. Therefore, both in FIGS. 10A and 10B, the GOP1 to the GOP4 correspond to the control unit times $L_1$ to $L_4$, respectively.

The threshold value of the second preferred embodiment, 0.2, is only one example. In accordance with the bit rate of the input stream or the picture structure, an optimal value may be selected as appropriate. Though the case where the control unit times are connected on a GOP basis has been discussed in the second preferred embodiment, the control unit times may be corrected on a frame basis.

Thus, in the second preferred embodiment, the control unit time is corrected adaptively in accordance with the ratio of the I picture frames included in the GOP of the input stream. This can reduce the variation of the average input bit rate $S_n$, and with the constant average input bit rate $S_n$, it is possible to perform an optimal rate control.

<3-3. Variation>

Next, a variation will be discussed. This is a variation of the above-discussed second preferred embodiment. In the second preferred embodiment, the number of I picture frames relative to the number of all frames included in the GOP is the ratio of the I picture frames. In MPEG2, generally, the bit ratio of I, P and B picture frames constituting the GOP is I:P:B=5:3:1. In this variation, respective weighted numbers are obtained by multiplying the respective numbers of I, P and B picture frames constituting the GOP by the bit ratio and the ratio of the I picture frames is obtained by using these weighted numbers.

Since the ratio of the I picture frames becomes higher with weighting, the threshold value has only to be set to any value larger than 0.2 which is used in the second preferred embodiment. For example, any value in a range from 0.22 to 0.24 may be used.

In the exemplary case shown in FIGS. 10A and 10B, for example, the ratio of the I picture frames in the GOP2 is 1/6≈0.17, which satisfies the condition for the control unit time in the second preferred embodiment. On the other hand, when weighting, the number of I picture frames is 1×5=5 and the number of P picture frames is 5×3=15. Therefore, the weighted number of all frames in the GOP2 is 20 and the weighted ratio of the I picture frames in the GOP2 is 5/20=0.25.

Then, discussion will be made on the control unit time made by connection of the GOP2 and the GOP3. The weighted number of I picture frames in the GOP3 is 1×5=5, the weighted number of P picture frames is 3×3=9 and the weighted number of B picture frames is 8×1=8. Therefore, the weighted number of all frames in the GOP3 is 22 and the weighted number of I picture frames is 5. In the control unit time by connection of the GOP2 and the GOP3, since the weighted number of all frames is 42 and the weighted number of I picture frames is 10, the weighted ratio of the I picture frames is 10/42≈0.24.

Therefore, if the threshold value is 0.24, correction is made with the period made by connection of the GOP2 and the GOP3 as the control unit time. If the threshold value is less than 0.24, the GOP4 is further connected thereto.

Thus, by weighting with the bit ratio of the I, P and B picture frames, it is possible to further reduce the variation of the average input bit rate $S_n$ to be smaller.

While the invention has been shown and described in detail, the foregoing description is in all aspects illustrative and not restrictive. It is therefore understood that numerous modifications and variations can be devised without departing from the scope of the invention.

What is claimed is:

1. A transcoder for converting a first stream into a second stream, comprising:
    a period determination part configured to determine a control unit time;
    a part configured to acquire a bit rate of the first stream per the determined control unit time;
    a quantization step value calculation part configured to calculate a quantization step value of the second stream by using information on the first stream including the acquired bit rate of the first stream per the control unit time; and
    a period conversion factor calculation part configured to calculate a period conversion factor $\alpha_{n+1}$ in a (N+1) period on the basis of
        a ratio $T_{n+1}/S_n$ between a target bit rate $T_{+1}$ of the second stream in the (N+1) period and a bit rate $S_n$ of the first stream in the N period, using the following equation: $\alpha_{n+1}=f(T_{n+}/S_n)$, where f(x) is a function of a variable x, or
        a ratio $T_{n+1}/AS_n$ between the target bit rate $T_{n+1}$ of the second stream in the (N+1) period, and an average bit rate $AS_n$ of the first stream in a period from a (N−M+1) period, where M is a natural number, through the N period, using the following equation: $\alpha_{n+1}=f(T_{n+1}/AS_n)$, where f(x) is a function of the variable x, wherein
    said period determination part determines each control unit time so that a ratio of I picture frames included in each control unit time becomes not more than a predetermined ratio, and
    said quantization step value calculation part includes a part that is configured to calculate the quantization step value of the second stream of the (N+1) period by multiplying a quantization step value of the first stream in the (N+1) period by said period conversion factor.

2. The transcoder according to claim 1, wherein
said period determination part determines a GOP as said control unit time if the ratio of I picture frames in the GOP is not more than said predetermined ratio, and said period determination part connects a plurality of GOPs until the ratio of I picture frames becomes not more than said predetermined ratio and determines the connected GOPs as said control unit time if the ratio of I picture frames in the GOP exceeds said predetermined ratio.

3. The transcoder according to claim 2, wherein
said period determination part sets predetermined weights for I, P and B picture frames, respectively, and with weighting, it is judged whether the ratio of I picture frames in the GOP is not more than the predetermined ratio or not.

4. The transcoder according to claim 1, further comprising a target bit rate determining part configured to determine the target bit rate of the second stream in the (N+1) period on the basis of a target bit rate of a whole second stream, a bit rate of the second stream converted before the N period and a target bit rate of the second stream in the N period.

5. The transcoder according to claim 4, wherein
assuming that a ratio between the bit rate of the second stream converted before the N period and the target bit rate of the second stream in the N period is determined as a target ratio, said target bit rate determining part calculates the target bit rate of the second stream in the (N+1) period on the basis of a ratio between the target bit rate of the whole second stream and said target ratio.

6. The transcoder according to claim 5, wherein
assuming that a ratio between a bit rate of the first stream in a (N−1) period and the bit rate of the first stream in the N period is determined as a period ratio, said target bit rate determining part adjusts said target ratio by multiplying said target ratio by said period ratio.

7. The transcoder according to claim 5, wherein
assuming that a ratio between the bit rate of the first stream in the N period and a bit rate of the first stream in the (N+1) period is determined as a period ratio, said target bit rate determining part adjusts said target ratio by multiplying said target ratio by said period ratio.

8. The transcoder according to claim 4, wherein
assuming that a value calculated on the basis of a difference between the target bit rate of the second stream in the N period and the bit rate of the second stream converted before the N period is determined as a target difference, said target bit rate determining part calculates the target bit rate of the second stream in the (N+1) period by adding said target difference to the target bit rate of the whole second stream.

9. The transcoder according to claim 8, wherein
assuming that a ratio between the bit rate of the first stream in the N period and a bit rate of the first stream in a (N−1) period is determined as a period ratio, said target bit rate determining part adjusts said target difference by multiplying said target difference by said period ratio.

10. The transcoder according to claim 8, wherein
assuming that a value calculated on the basis of a difference between the bit rate of the first stream in the N period and a bit rate of the first stream in a (N−1) period is determined as a period difference, said target bit rate determining part adjusts said target difference by multiplying said target difference by said period difference.

11. The transcoder according to claim 8, wherein
assuming that a value calculated on the basis of a difference between the bit rate of the first stream in the N period and a bit rate of the first stream in a (N−1) period is determined as a period difference, said target bit rate determining part adjusts said target difference by adding said period difference to said target difference.

12. A transcoder for converting a first stream into a second stream, comprising:
circuitry configured to
determine a control unit time;
acquire a bit rate of the first stream per the determined control unit time;
calculate a quantization step value of the second stream by using information on the first stream including the acquired bit rate of the first stream per the control unit time;
calculate a period conversion factor $\alpha_{n+1}$ in a (N+1) period on the basis of
a ratio $T_{n+1}/S_n$ between a target bit rate $T_{n+1}$ of the second stream in the (N+1) period and a bit rate $S_n$ of the first stream in the N period, using the following equation: $\alpha_{n+1}=f(T_{n+1}/S_n)$, where f(x) is a function of a variable x, or
a ratio $T_{n+1}/AS_n$ between the target bit rate $T_{n+1}$ of the second stream in the (N+1) period and an average bit rate $AS_n$ of the first stream in a period from a (N−M+1) period, where M is a natural number, through the N period, using the following equation: $\alpha_{n+1}=f(T_{n+1}/AS_n)$, where f(x) is a function of the variable x, wherein
said circuitry determines each control unit time so that a ratio of I picture frames included in each control unit time becomes not more than a predetermined ratio, and calculates the quantization step value of the second stream of the (N+1) period by multiplying a quantization step value of the first stream in the (N+1) period by said period conversion factor.

\* \* \* \* \*